(12) United States Patent
Wei et al.

(10) Patent No.: US 8,828,179 B2
(45) Date of Patent: Sep. 9, 2014

(54) COMPOUND PAPER STICKING PROCESS FOR LITHIUM ION BATTERY FUSES

(75) Inventors: Johnny Wei, Dongguan (CN); Skipper Zhu, Dongguan (CN); Hellen Zhou, Dongguan (CN)

(73) Assignee: Dongguan NVT Technology Co., Ltd., Dongguan, Guangdong (CN)

( * ) Notice: Subject to any disclaimer, the term of this patent is extended or adjusted under 35 U.S.C. 154(b) by 0 days.

(21) Appl. No.: 13/355,498

(22) Filed: Jan. 21, 2012

(65) Prior Publication Data

US 2013/0186545 A1 Jul. 25, 2013

(51) Int. Cl.
*B29C 65/00* (2006.01)
*B32B 37/00* (2006.01)

(52) U.S. Cl.
USPC ............ 156/302; 429/61; 429/62; 156/297; 156/299; 156/552

(58) Field of Classification Search
USPC ............ 429/61, 62; 156/297, 299, 302, 552; 53/591, 592, 594
See application file for complete search history.

(56) References Cited

U.S. PATENT DOCUMENTS 5,259,911 A * 11/1993 Ohnishi et al. ............ 156/552

* cited by examiner

*Primary Examiner* — Katarzyna Wyrozebski Lee
*Assistant Examiner* — Carson Gross
(74) *Attorney, Agent, or Firm* — Jackson IPG PLLC

(57) ABSTRACT

The invention discloses a compound paper sticking process for lithium ion battery fuses, which comprises the following steps: a compound paper tape formed by the composite of square compound paper and L-shaped compound paper is prepared; a compound paper tape is installed on a semi-automatic compound paper sticking machine; the semi-automatic compound paper sticking machine is started and the compound paper tape moves forward; the semi-automatic compound paper sticking machine stops moving when the compound paper tape moves to working position; operators stick battery fuses on the compound paper of the compound paper tape; the semi-automatic compound paper sticking machine is started and the compound paper of the tape with battery fuse moves forward; the operators take down the battery fuse moved to a rewinding shaft at the other end of the semi-automatic compound paper sticking machine; the compound paper of battery fuse is shaped manually.

9 Claims, 1 Drawing Sheet

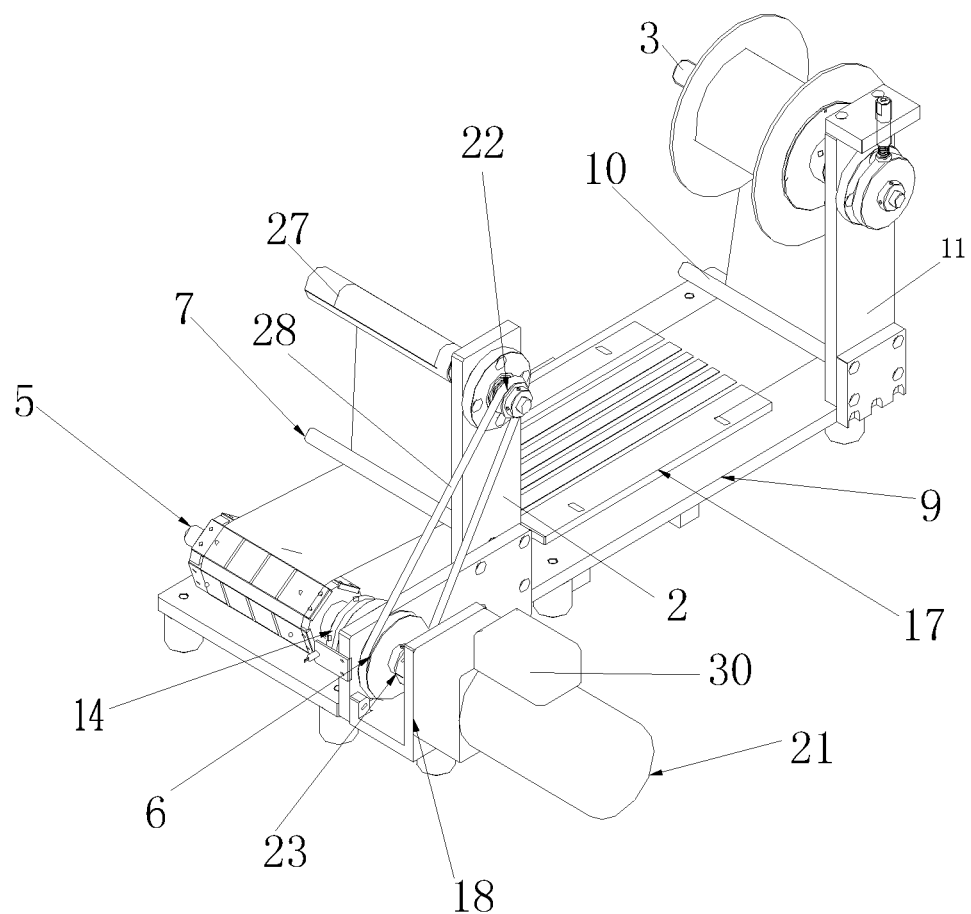

COMPOUND PAPER STICKING PROCESS FOR LITHIUM ION BATTERY FUSES

TECHNICAL FIELD

The invention relates to a lithium ion battery, in particular to a compound paper sticking process for lithium ion battery fuses.

BACKGROUND OF THE INVENTION

In the prior art, a piece of compound paper needs to be stuck respectively on a Ni sheet and a Ni/Al cladding strip at the two sides of a lithium ion battery fuse. The two pieces of compound paper have edges of different shapes. One piece of compound paper is square and the other piece is of L shape. Currently, the compound paper is taken manually from the release paper and then stuck on a product. Manual operation is required for twice respectively for tearing out the compound paper and sticking compound paper. Two pieces of compound paper are stuck on a product. In accordance with the requirement of the product, the misplacement of upper and lower layers of the compound paper stuck should be less than or equal to 0.3 mm. The clearance between the compound paper and the product is less than 0.2 mm. Two pieces of compound paper of different shapes are stuck respectively on the Ni sheet and Ni/Al cladding strip of the fuse, increasing the difficulty of manual sticking of compound paper, decreasing speed, making the station of compound paper sticking the bottleneck of the whole production and requiring more personnel for increasing the output. The production efficiency is low. Manual operation cannot achieve accurate positioning, resulting in lots of products needing rework and defective products. Handwork is highly relied on. Two pieces of compound paper needs to be stuck in sequence in each procedure, requiring excessive working hours.

SUMMARY OF THE INVENTION

The aim of the invention is to eliminate the defect of the prior by providing a compound paper sticking process for lithium ion battery fuses which can increase working efficiency, correctly position sticking position and improve product quality.

In order to achieve the aim, the technical proposal adopted by the invention is as follows:

A compound paper sticking process for lithium ion battery fuses comprises following steps:

a) installing a compound paper tape on a semi-automatic compound paper sticking machine;

b) starting the semi-automatic compound paper sticking machine and letting the compound paper tape move forward;

c) letting the semi-automatic compound paper sticking machine stop moving when the compound paper tape moves to working position of the semi-automatic compound paper sticking machine; sticking a plurality of battery fuses on the compound paper of the compound paper tape; and d) starting the semi-automatic compound paper sticking machine and letting the compound paper of the tape with battery fuse move forward; taking down the battery fuse which moves to a rewinding shaft at the other end of the semi-automatic compound paper sticking machine and obtaining a semi-finished product.

The compound paper tape is formed by the composite of square compound paper and L-shaped compound paper.

The compound paper on the battery fuse is shaped manually for the semi-finished product.

A plurality of battery fuses are stuck on the compound paper tape simultaneously when the compound paper tape stops for one time in step c).

Battery fuses in step c) are stuck on the compound paper of the compound paper tape simultaneously or on the compound paper of the compound paper tape successively.

The semi-automatic compound paper sticking machine is provided with a bench. One end of the bench is provided with a first bracket. The upper part of the first bracket is provided with a feeding rotating shaft. The lower end of the first bracket is provided with a first guiding shaft. The other end of the bench is provided with a second bracket. The upper part of the second bracket is provided with a waste rewinding shaft while the lower part of the second bracket is provided with a second guiding shaft. The lower end of the second bracket is provided with a fetching roller. The outer side of the bench is provided with a drive motor connected with the shaft of the fetching roller. A driving device is arranged between the roller shaft and the waste rewinding shaft. The middle part of the bench is provided with a work platform. One end of the fetching roller a sensing plate and a corresponding sensor. The sensor and the drive motor are connected with a control device.

The fetching roller is provided with a polygonal cross section, which is convenient for taking out the battery fuse.

The fetching roller is provided with a pentagonal cross section.

The driving device comprises a big pulley arranged on the roller rotating shaft and a small pulley arranged on the waste rewinding shaft. A driving belt is arranged between the big pulley and small pulley, which is convenient for synchronous operation with the roller rotating shaft.

The bottom spacing of the bench is provided with a supporting seat, which facilitates the stable operation of the bench.

The invention has advantages that a plurality of battery fuses can be stuck on multiple pieces of compound paper simultaneously. The invention changes prior process of sticking compound paper on battery fuses into a process of sticking battery fuses on compound paper, which improves the accuracy and efficiency of compound paper sticking, causes work done by multiple personnel to be done by two personnel and saves labor and time required. Special compound paper is used for facilitating accurate positioning and avoiding incorrect sticking. The principle of positioning of a sensor solves the problem of defective dimension, thus leading to smooth operation without manual adjustment, maintaining operation at a relatively low class without changing labor force and reducing 40%-50% of working hour.

BRIEF DESCRIPTION OF THE DRAWING

FIG. 1 is the stereogram for the structure of the semi-automatic compound paper sticking machine used in the process of the invention.

DETAILED DESCRIPTION OF THE PREFERRED EMBODIMENTS

The invention provides a compound paper sticking process for lithium ion battery fuses, which comprises following steps:

a) The compound paper tape formed by the composite of square compound paper and L-shaped compound paper is prepared;

b) The compound paper tape is installed on the semi-automatic compound paper sticking machine;

c) The semi-automatic compound paper sticking machine is started and the compound paper tape moves forward;

d) The semi-automatic compound paper sticking machine stops moving when the compound paper tape moves to the working position of the semi-automatic compound paper sticking machine; the operator sticks a plurality of battery fuses on the compound paper of the compound paper tape;

e) The semi-automatic compound paper sticking machine is started and the compound paper of the tape with battery fuse moves forward; the battery fuse moved to a rewinding shaft at the other end of the semi-automatic compound paper sticking machine is taken down; and f) The compound paper stuck with battery fuses is shaped manually so as to obtain a semi-finished product.

In step d) of the compound paper sticking process for lithium ion battery fuses, when the gummer paper tape stops each time, 6 lithium ion battery fuses are stuck on the gummer paper tape.

As shown in FIG. 1, a semi-automatic compound paper sticking machine is designed for the process. The semi-automatic compound paper sticking machine is provided with a bench 9. The bottom of the bench 9 is provided with a supporting seat 8. One end of the bench 9 is provided with a first bracket 11. The upper part of the first bracket 11 is provided with a feeding rotating shaft 3. The lower end of the first bracket 11 is provided with a first guiding shaft 10 parallel to the feeding rotating shaft 3. The other end of the bench 9 is provided with a second bracket 2. The upper part of the second bracket 2 is provided with a waste rewinding shaft 27. The lower part of the second bracket 2 is provided 2 with a second guiding shaft 7. One side of the lower end of the second bracket 2 is provided with a fetching roller 5 with a pentagonal cross section. The outer side of the bench 9 is provided with a drive motor 21 connected with a rotating shaft of the fetching roller 5. A transmission device is arranged between the rotating shaft of the roller and the waste rewinding shaft 27. The middle part of the bench 9 is provided with a work platform 17. One end of the fetching roller 5 is provided with a sensing plate 14 and a corresponding sensor 25. The sensor 25 and the drive motor 21 are connected with a control device 30. The IR sensor can correctly transport the compound paper tape to designated position, thus bringing convenience to operators. A big pulley 6 is arranged on the fetching roller 5 while a small pulley is arranged on the waste rewinding shaft 27. A driving belt 28 is arranged between the big pulley 6 and the small pulley 22.

What is claimed is:

1. A compound paper sticking process for battery fuses, comprising the following steps:
    a) installing compound paper tape on a first end of a semi-automatic compound paper sticking machine;
    b) starting the semi-automatic compound paper sticking machine to advance the compound paper tape;
    c) stopping the semi-automatic compound paper sticking machine when the compound paper tape moves to a working position of the semi-automatic compound paper sticking machine;
    d) sticking a plurality of battery fuses to the compound paper tape adjacent the working position; and
    e) starting the semi-automatic compound paper sticking machine to advance the compound paper tape with attached plurality of battery fuses.

2. The compound paper sticking process for battery fuses according to claim 1, wherein the compound paper tape is formed by the composite of square-shaped compound paper and L-shaped compound paper.

3. The compound paper sticking process for battery fuses according to claim 1, wherein the plurality of battery fuses are stuck on the compound paper tape simultaneously when the compound paper tape stops.

4. The compound paper sticking process for battery fuses according to claim 1, wherein the plurality of battery fuses are stuck on the compound paper tape in sequence when the compound paper tape stops.

5. The compound paper sticking process for battery fuses according to claim 1, wherein the semi-automatic compound paper sticking machine is provided with a bench, where one end of the bench is provided with a first bracket, where an upper part of the first bracket is provided with a feeding rotating shaft and a lower end of the first bracket is provided with a first guiding shaft; and where another end of the bench is provided with a second bracket, where an upper part of the second bracket is provided with a waste rewinding shaft while a lower part of the second bracket is provided with a second guiding shaft; where one side of the lower end of the second bracket is provided with a fetching roller; where an outer side of the bench is provided with a drive motor connected with a rotating shaft of the fetching roller; where a driving device is arranged between a roller rotating shaft and the waste rewinding shaft; where a middle part of the bench is provided with a work platform, where one end of the fetching roller is provided with a sensing plate and a corresponding sensor, wherein the sensor and the drive motor are connected with a control device.

6. The compound paper sticking process for battery fuses according to claim 5, wherein the fetching roller is provided with a polygonal cross section.

7. The compound paper sticking process for battery fuses according to claim 6, wherein the fetching roller is provided with a pentagonal cross section.

8. The compound paper sticking process for battery fuses according to claim 5, wherein the driving device comprises a big pulley arranged on the roller rotating shaft and a small pulley arranged on the waste rewinding shaft and wherein a driving belt is arranged between the big pulley and small pulley.

9. The compound paper sticking process for battery fuses according to claim 5, wherein a bottom of the bench is provided with a supporting seat.

* * * * *